3,112,206
BINDER COMPOSITION FOR USE IN SAND MOLDS
Steven Mocsny, Corona, Calif.
(1140 Cortez Road, Arcadia, Calif.)
No Drawing. Filed Jan. 19, 1960, Ser. No. 3,249
3 Claims. (Cl. 106—38.5)

This invention relates to the art of sand molds and has to do, more particularly, with a product which, when mixed, as a binder, with either green sand or dry sand, provides a sand mold having distinctively advantageous features and which, when sprayed on the molding surface of an ingot mold, prevents adherence to the mold of the splash metal which normally results when the molten metal is being poured into a mold.

It is among the objects of my invention to provide a sand mold binder and conditioning composition: (a) which works equally well in green and dry sand molds; (b) which provides a sand mold with unusually good tensile strength; (c) which thus results in stable sand surfaces on which molten metal flows smoothly; (d) which helps to neutralize free oxygen, reduces oxidation, and which eliminates rough casting surfaces; (e) whose increased hot strength reduces buckling, scabbing, and veining; (f) which prevents moisture absorption and causes the mold to become waterproof on drying; (g) which leaves no appreciable ash to contaminate the sand, thus enabling the sand to be repeatedly used; (h) which is not affected in its bonding efficiency by the admixture of clays, bentonite, silica flour, fines, or old sands; and (i) which is highly economical.

It has long been conventional practice to use, as a binder for mold sands, an inorganic hydrocarbon material commonly known as gilsonite. I have found, however, that the above-enumerated advantages are obtainable by mixing, with the gilsonite, critical proportions of calcium (CaO), magnesium (MgO), lignin, and wood sugars.

In the practice of my invention, I employ a gilsonite having a melting point of from 270° to 360° F.; ground or pulverized to such fineness that at least ninety percent of the particles will pass through the mesh of a U.S. standard 100 mesh screen.

I then form a composition containing the gilsonite and the following additional components: calcium, magnesium, lignin, and wood sugars, all in such pulverulent form that at least ninety percent of the particles will pass through a U.S. standard screen of 100 mesh or smaller. The lignin which it is my preference to use is obtained from the sulfate liquors of wood pulp formed from southern pine, and the sugars which I use are normally to be found in said liquors. The liquors are dehydrated to provide lignin and sugar solids which are ground to the desired screen size.

After reducing the components of my mixture to such pulverulent form, I then thoroughly admix the components, preferably in batches of not greater than one thousand pounds, for a period of not less than ten minutes. The composition is then ready to be admixed with conventional mold sand.

The following proportions, by weight, of said components constitute my preferred composition:

|  | Percent |
|---|---|
| Gilsonite | 75.00 |
| Calcium | 1.25 |
| Magnesium | .70 |
| Lignin | 17.44 |
| Sugar | 5.05 |
| Moisture ($H_2O$) | .56 |

Said relative proportions are quite critical and should not be varied by more than one-half percent.

For making a green sand mold, it is my preference that the weight of the composition be from .1% to .5% of the weight of the sand; and, in a dry sand mold, it is my preference that the weight of the composition be from .5% to 2% of the weight of the sand.

While I have described my composition more particularly as a binder to be admixed with the sand for the mold, I find that it is advantageous when used merely as a spray applied to the molding surface of an ingot mold, the composition being sprayed in dry form. It then adheres to the mold walls and prevents splash metal from adhering to the sides of the mold.

I claim:
1. A composition for use in sand molds consisting of a mixture of particles of the following materials in the following proportions by weight: gilsonite having a melting point of 270° F.–360° F. 75%, calcium (CaO) 1.25%, magnesium (MgO) .70%, lignin 17.44%, sugar 5.05% and moisture ($H_2O$) .56%.
2. The composition of claim 1 wherein said particles are of such size that at least 90% of them will pass through a U.S. standard 100 mesh screen.
3. The composition of claim 2 wherein said lignin and sugar are derived from sulfate liquors of southern pine pulp.

References Cited in the file of this patent
UNITED STATES PATENTS

| 2,256,832 | King | Sept. 23, 1941 |
| 2,714,582 | Day | Aug. 2, 1955 |

OTHER REFERENCES

Lewis: "A Review of By-Products of Sulphite Pulping," July 8, 1948, Paper Trade Journal (pages 51–55).